J. G. NOLEN.
SUPERVISORY SYSTEM.
APPLICATION FILED OCT. 10, 1910.

1,071,171.

Patented Aug. 26, 1913.

4 SHEETS—SHEET 1.

Witnesses:
Inventor
By his Attorney

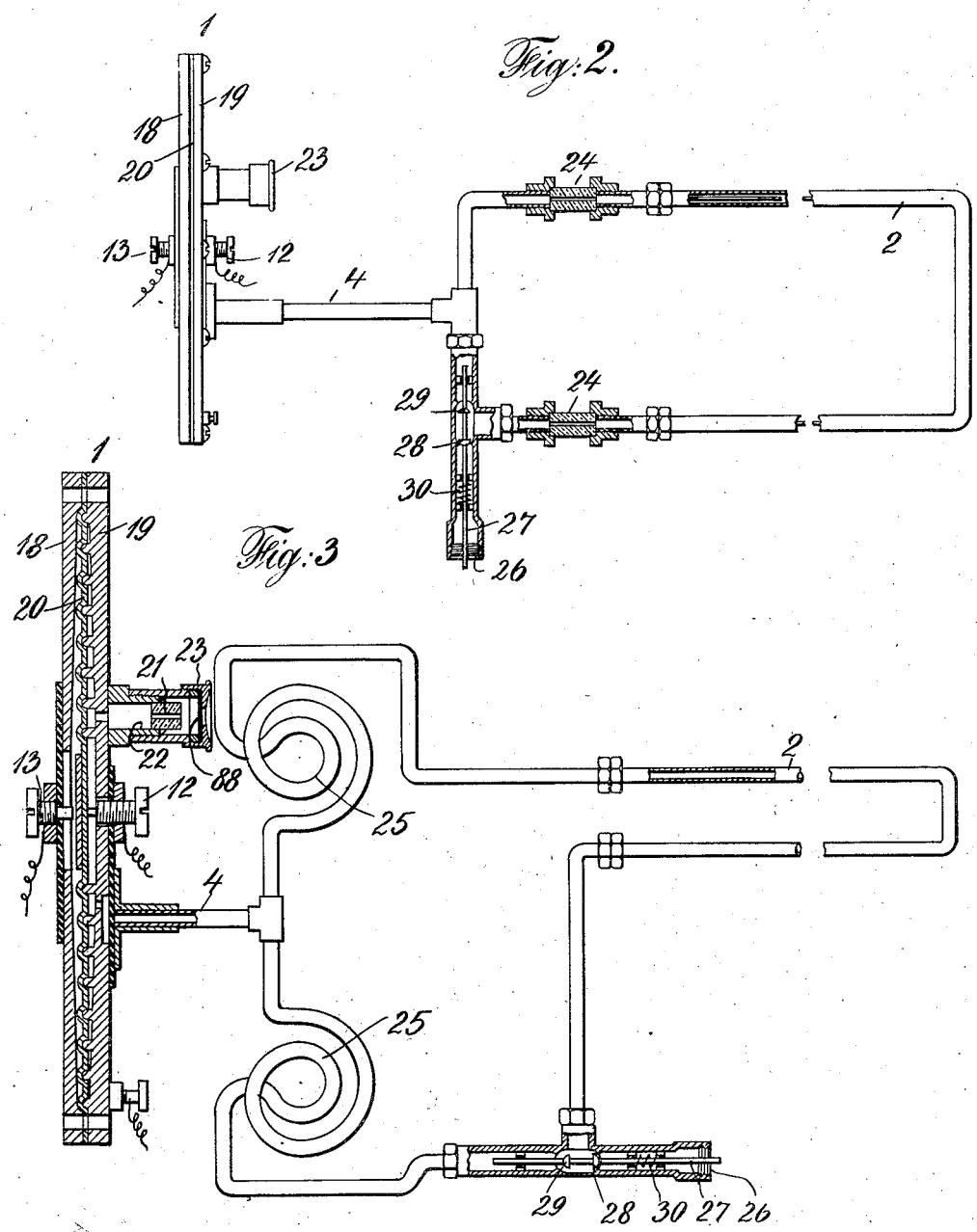

J. G. NOLEN.
SUPERVISORY SYSTEM.
APPLICATION FILED OCT. 10, 1910.

1,071,171.

Patented Aug. 26, 1913.
4 SHEETS—SHEET 3.

Witnesses:
Max B. A. Doring
Paul H. Frank

Inventor
James G. Nolen
By his Attorney

J. G. NOLEN.
SUPERVISORY SYSTEM.
APPLICATION FILED OCT. 10, 1910.
1,071,171.
Patented Aug. 26, 1913.
4 SHEETS—SHEET 4.
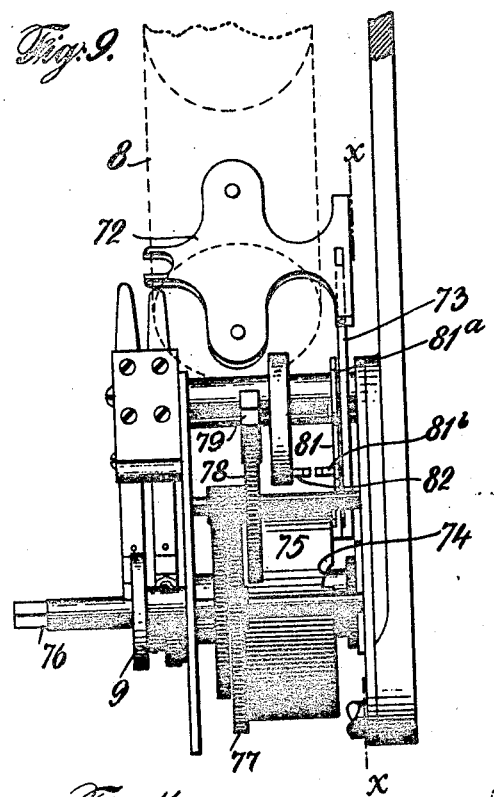
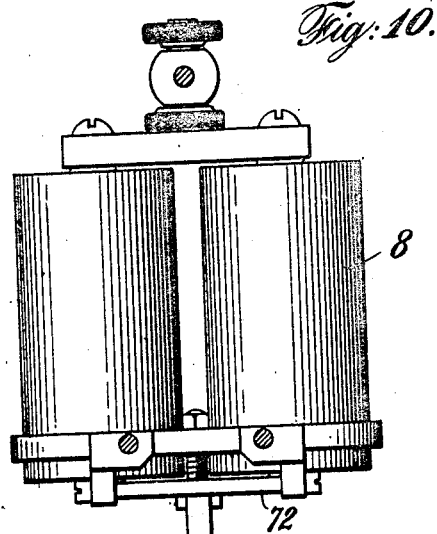
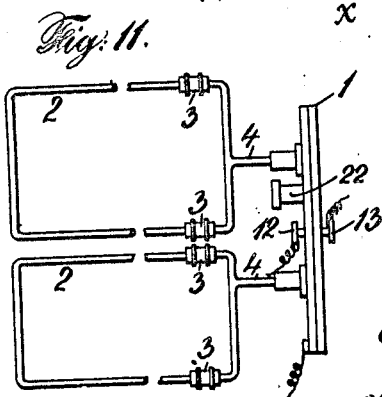
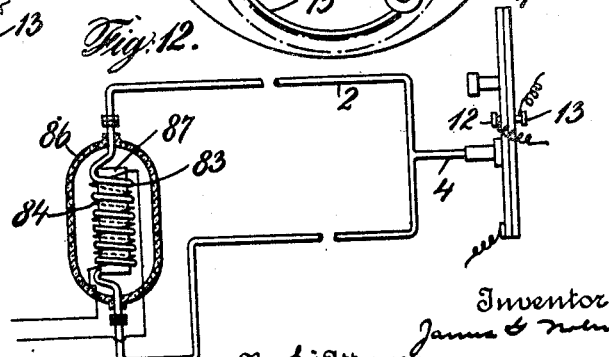

UNITED STATES PATENT OFFICE.

JAMES G. NOLEN, OF NEW YORK, N. Y., ASSIGNOR TO FIRE PROTECTION DEVELOPMENT COMPANY, OF NEW YORK, N. Y., A CORPORATION OF MAINE.

SUPERVISORY SYSTEM.

1,071,171.  Specification of Letters Patent.  Patented Aug. 26, 1913.

Original application filed July 23, 1909, Serial No. 509,103. Divided and this application filed October 10, 1910. Serial No. 586,300.

*To all whom it may concern:*

Be it known that I, JAMES G. NOLEN, a citizen of the United States, residing at New York, in the county of New York and State of New York, have invented a certain new and useful Supervisory System, of which the following is a specification.

My invention relates to supervisory alarm systems such as are employed for indicating sudden and excessive rise in temperature, and particularly to electropneumatic systems of the class referred to. Such systems comprise piping of small bore laid through the space to be protected or supervised, and connected to one or more pressure-actuated alarm-initiating devices, which latter devices are arranged to be actuated by expansion of air in the piping caused by sudden rise of temperature, and may themselves indicate the alarm, or may be electric contact devices adapted when actuated to transmit an alarm through an electric circuit, or to set in operation other transmitting means; or these fluid-pressure-actuated alarm-initiating devices may operate to effect indication of abnormal conditions, or to effect the transmission of a signal, in various other ways.

My invention comprises an improved annunciator device, and various electrical features as hereinafter described and particularly pointed out in the claims.

The object of my invention is to improve supervisory alarm systems of the type referred to, and to make them more reliable, satisfactory and elastic.

I will now proceed to describe my invention with reference to the accompanying drawings, in which I have indicated, more or less diagrammatically, my improved supervisory alarm system, and certain of the apparatus adapted for use therein.

Figure 1:
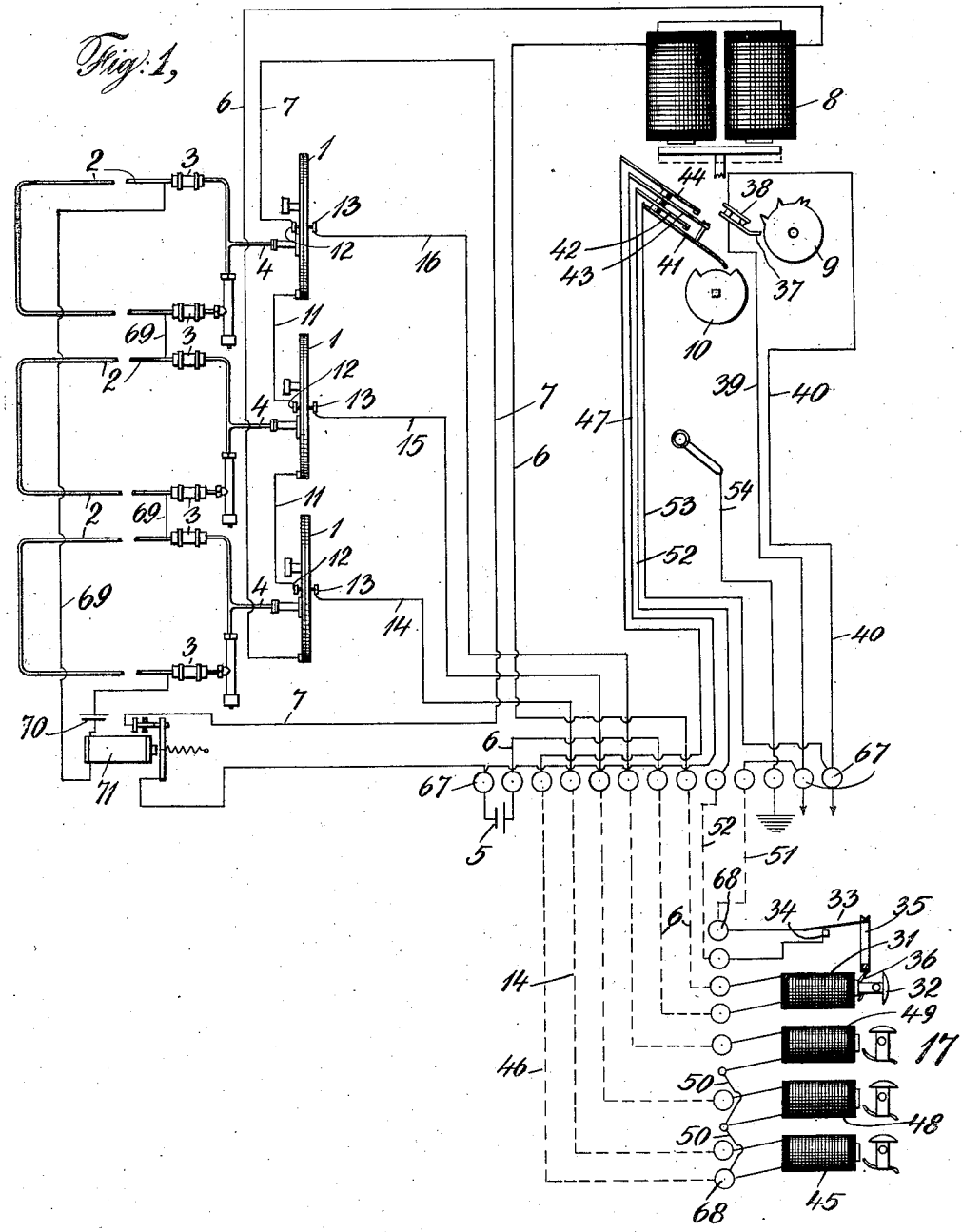
Figure 4:
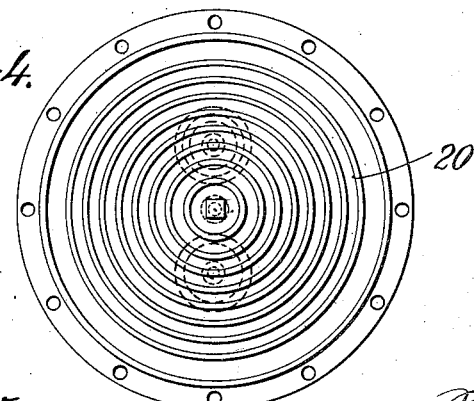
Figure 5:
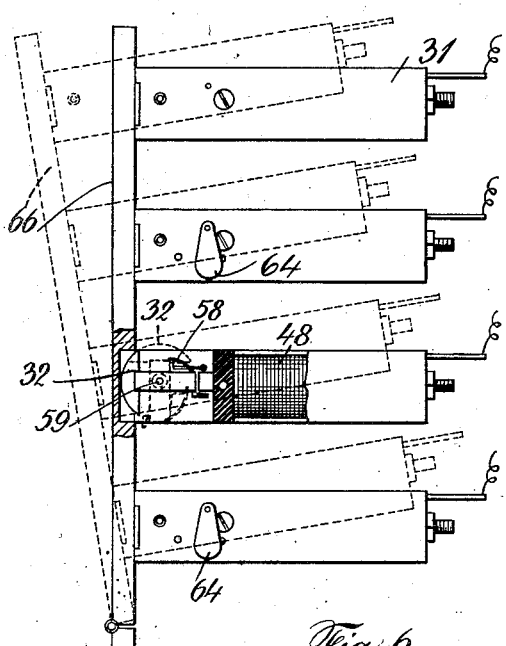
Figure 8:
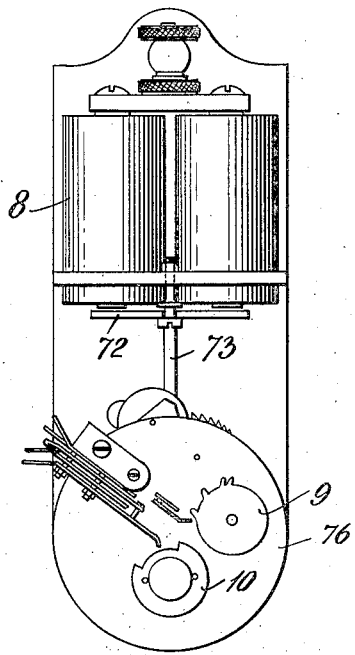
Figure 6:
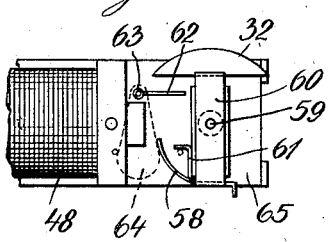
Figure 7:
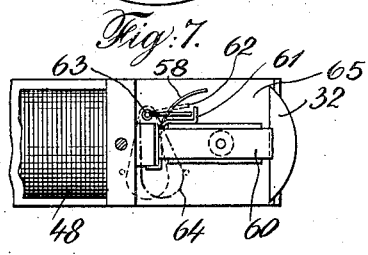

In said drawings: Figure 1 is a general diagram of the system. Fig. 2 shows a side elevation of one of the diaphragm contact devices and of a loop of detector piping connected thereto and including one form of impedance device, the impedance devices and a portion of the piping being shown in section. Fig. 3 is a view similar to Fig. 2, except that an alternative form of impedance device is shown, and except that the diaphragm contact device is shown in section. Fig. 4 shows a detail front view of the diaphragm contact device with one plate of the diaphragm chamber removed. Fig. 5 shows a detail fragmentary view of an annunciator adapted for use in the system, one of the annunciator drop mechanisms being shown in section. Fig. 6 shows a detail fragmentary elevation of one of the annunciator drop mechanisms, showing the shutter in the "down" or concealed position; and Fig. 7 is a similar view showing the shutter in its "up" or displayed position. Fig. 8 shows a front elevation of one form of alarm transmitter that may be employed; Fig. 9 shows a side perspective elevation thereof, and Fig. 10 a rear elevation thereof, the back plate or frame plate having been removed, the view being a section on the line x—x of Fig. 9. Fig. 11 is a detail diagrammatic view illustrating the connection of a plurality of detector loops to the same signal initiating device. Fig. 12 is a diagrammatic view illustrating a device for testing the detector tubes.

Referring first to Fig. 1; numerals 1 designate fluid-pressure-actuated signal-initiating or alarm-initiating devices, connected to loops of detector piping, 2, 2; each such loop including, on opposite sides, impedance devices 3, 3, and each loop being connected to the corresponding alarm-initiating contact device, 1, between the impedance devices 3, by a connection 4. 5 designates a battery, and 6 and 7 circuit conductors therefrom to the contact devices 1, said contact devices being connected in series in circuit 6—7. This circuit includes the release magnet, 8, of a clockwork alarm-transmitter, shown in Figs. 8, 9 and 10 and of which 9 and 10, constitute break-wheels or signal-wheels. Wire 6 leads to the frame of the first diaphragm contact device, and a wire 11 leads from the rear contact, 12, of that contact device, to the frame of the next contact device; and so on. Each diaphragm contact device also has a front contact, 13, connected by an individual wire, 14, or 15, or 16, etc., to the magnet of a corresponding drop mechanism in an annunciator, indicated diagrammatically at 17. The operation of one of the contact devices or alarm-initiating devices, 1, will therefore cause the operation of the break-wheels of the alarm transmitter, and will also cause the shutter of the corresponding annunciator drop to rise to displayed position.

Referring to Fig. 3, it will be seen that the diaphragm contact devices 1 each comprise a front plate, 18, a rear plate, 19, and a flexible diaphragm 20, also a front contact screw 13, and a rear contact screw, 12. Each such diaphragm contact device is also provided with a restricted or regulated escape or leakage device, comprising a short glass tube, 21, of very fine bore, set into a cup 22, and normally covered over by a perforate protecting cap, 23.

As shown in Fig. 2, similar tubes, there designated by numerals 24, form effective impedance in the two sides of the loop; or, in lieu of such tubes, coils 25 may be employed as impedance devices, as shown in Fig. 3. It is not to be understood that the mere coiling of the detector tubing in itself materially increases the resistance to flow through the tubing; what is required, when such impedance devices are employed, is, that there shall be a sufficient length of the detector tubing in such close proximity to the contact device, and so protected, that leakage or obstruction shall not be likely to occur in such length of the detector tubing or between it and the connection to the contact device 1; and in order to have a sufficient length of detector tubing in close proximity to the contact device, and therefore protected to the same extent that such contact device is protected, it is most convenient to coil the pipe. The resistance of this detector pipe to flow of air through it is such that if a few feet of pipe intervene between a break in the pipe and a point at which heat is applied suddenly, or a point at which pressure is to be effective, the leakage at the break will not prevent operation of the contact device. On the other hand, expansion of the air in the tube at any localized point will cause a sort of wave or pulse of air to pass through the tube, in both directions, so insuring the operation of the corresponding contact device. Since, however, these waves or pulses of air pressure are often delicate, it is desirable to localize the effect of them on the diaphragm, rather than to permit them to spread out through the diaphragm chamber and lose effect. To this end, as shown particularly in Figs. 3 and 4, both the diaphragm and the back plate of the diaphragm chamber are deeply corrugated, and normally the corrugations of the diaphragm lie close on the corrugations of the back plate. The connection 4 from the detector loop leads into one of the grooves in the back plate of the diaphragm chamber. The result of this construction is that the effect of a pulse of air coming in through connection 4 is at first confined to the groove or corrugation with which that pipe 4 connects, the diaphragm, therefore, being moved quickly, so that it is caused to break contact quickly with its rear contact, 12, and to close contact quickly with its front contact, 13.

It is necessary to provide for the introduction of air into the loops of detector pipe, from time to time, in order to test the loops for responsiveness to rise of pressure exceeding a standard rate. To this end, I provide in each such pipe loop a T valve casing, having at one end a screw-threaded connection, 26, for a suitable pump, or other testing device, and having within it a valve stem 27 having two valve plugs, 28 and 29, adapted to fit against corresponding seats in the valve casing. Normally, valve plug 28 prevents escape of air through the open connection 26, and a spring 30 tends to hold the valve stem in such normal position; but when the pump is applied to the valve casing and air is pumped in through connection 26, the valve stem is shifted and valve plug 29 then prevents the air so pumped in from passing directly by the shortest path to the diaphragm contact device and forces the air to pass throughout the length of the corresponding loop of detector tubing 2.

As shown particularly in Fig. 1, the circuit conductor 6, after leaving battery 5, passes through the coils of the magnet of annunciator drop 31, and thence passes to the coils of transmitter magnet 8. The annunciator drop 31 differs from the other drops of the annunciator in that its shutter is normally "up", that is to say, in position such that the shutter 32, shows. The breaking of the circuit through this magnet (such as may be occasioned by the breaking of the circuit 6—7), or material decrease in the strength of current from the battery, such as may be occasioned by the battery becoming exhausted, causes this shutter to "fall", i. e., to move out of sight or to the position in which the other shutters are shown in Fig. 1; for, as will be explained hereinafter, the magnets of these annunciator drops, when energized, draw their armatures and the shutters connected to them into such position that the shutters are exposed to view; and the principal object of this particular drop 31, which is termed the "O K" drop, is to indicate whether circuit 6—7 is complete and the battery 5 supplying a sufficient amount of current, or whether the circuit 6—7 is broken or the battery 5 is supplying an insufficient amount of current. The annunciator drop 31 differs from the other drops of the annunciator 17 in that its armature operates an electrical contact in another circuit to be referred to presently. Such contact is indicated in Fig. 1, by a spring contact member 33, a contact stop 34, and a push rod 35, shown as arranged to be lifted by the armature 36 of the drop when said drop is in the normal position, with its shutter 32 displayed.

The signal transmitter comprising magnet 8 and transmitting wheels 9 and 10, will be described hereinafter. For present purposes it is sufficient to understand that this transmitter is of such nature that if the magnet 8 be deënergized, or if the current through it be insufficient to hold the armature of the magnet retracted, said transmitter will be set in operation and the signal wheels 9 and 10 will be revolved. Signal wheel 9 is toothed according to the number of the particular station where the detector loops 2 and alarm initiating device 1 are located; that is to say, this toothed wheel 9, when rotated, causes the transmission through a corresponding circuit of a signal number corresponding to the number for which the wheel is cut. In the particular instance shown in Fig. 1, the wheel is cut to transmit the number 112. The wheel actuates mechanically one of the two contact springs, 37 and 38, in a circuit 39—40, leading to suitable binding posts, and thence through the external line to a receiving station not shown. I have not indicated a battery in this circuit 39—40, as such battery will usually be located at the central or receiving station. The other signal wheel, 10, which revolves at a slower rate of speed than wheel 9, operates mechanically two springs 41 and 43 of a set of four contact springs 41, 42, 43 and 44, of which 41 and 42 constitute one pair and 43 and 44 another pair, the contact springs of each pair being normally separate. These contact devices 41—42 and 43—44, constitute means for cutting out the annunciator during the first signal round and for closing a shunt across circuit 39—40 after one rotation of the signal wheel 9, in case the signal transmitter is started in operation through a break in circuit 6—7 or through partial or complete failure of battery 5; and in the closing of this shunt circuit the contact devices operated by the "O K" drop 31, plays an important part, as will be seen by following the circuit connections. The circuit is as follows: from the front contact screw 13 of one of the alarm initiating devices 1 (say, for example, the first of said devices), through the individual annunciator conductor 14 of that alarm initiating device, to the magnet of its corresponding annunciating drop, 45, thence through a conductor 46 to contact spring 44; and from the companion contact spring 43 another conductor 47 passes to the negative pole of battery 5; the positive pole of this battery being connected, as previously explained, through conductor 6, to the frame of the alarm initiating device 1 to which conductor 14 is connected. Similarly, one terminal of the magnet of each of the other annunciator drops, 48 and 49 (corresponding respectively each to one of the other two alarm-initiating devices), is connected by conductors 50 to conductor 46. The circuit of contact springs 41 and 42 is as follows: from conductor 39 through conductor 51 to the contact spring 33 of the "O K" annunciator drop, thence from the corresponding contact, 34, of this annunciator drop, through conductor 52 to spring 42; and from spring 41 through conductor 53 to conductor 40. It being understood that the relative speeds of signal wheels 9 and 10 are such that, after one rotation of wheel 9, wheel 10 raises springs 41 and 43 so as to close contact with springs 42 and 44 respectively, and it being further understood that when circuit 6—7 is broken, or when battery 5 fails, partly or completely, magnet 31 permits its shutter 32 to "fall", so causing contacts 33 and 34 to close, it will be seen that the effect is, to close a shunt across circuit 39—40 after one rotation of the signal wheel 9, so making further operation of the circuit 39—40 by contacts 37 and 38 of signal wheel 9 ineffective; this shunt being as follows: from conductor 39 through conductor 51, contacts 33 and 34, conductor 52, contact springs 42 and 41, and conductor 53 to conductor 40. It will further be seen, that in the normal operation of the apparatus, that is to say, when circuit 6—7 is complete, and when the strength of the current from battery 5 is sufficient to hold the shutter 32 of annunciator drop 31 in its displayed position, operation of signal wheel 10 coincidentally with operation of signal wheel 9, does not cause the closing of shunt connection across circuit 39—40, because at such times the shunt connection through conductors 51, 52, 53 and contact springs 41 and 42, is broken between contacts 33 and 34 of the annunciator drop 31. The function of contact springs 43 and 44 of this alarm transmitter is as follows: When one of the alarm initiating devices is operated through expansion of the air in its detector loop 2, so causing the diaphragm in that alarm initiating device to break contact with its rear contact screw 12 and to close contact with its front contact screw 13, the effect of the breaking of contact of said diaphragm with the rear contact screw 12, is to break the circuit 6—7, so deënergizing the magnet 8 of the signal transmitter and starting said transmitter in operation, and so causing signal wheels 9 and 10 to commence rotation. The effect of the closing of the contact between the diaphragm of the signal initiating device and its front contact screw 13, is to close a circuit from conductor 6 through the individual annunciator conductor 14, or 15, or 16, of that alarm initiating device, to the magnet of the corresponding annunciator drop, and thence through conductor 46 to contact spring 44. At the beginning and during the first revolution of the signal wheel 9, this circuit is broken between contact springs 44 and 43; so that the corresponding annunciator drop is not operated. But at about the conclusion of the first rotation of the signal wheel 9, signal wheel 10 closes contact between springs 43 and 44, and then the circuit just traced through the annunciator drop magnet is completed through spring 43, and conductor 47 to the negative pole of the battery 5, so that at or about the conclusion of one rotation of the signal wheel 9 the annunciator magnet corresponding to that particular alarm-initiating device 1 which has been operated, will be energized and will throw its corresponding shutter into the displayed position. There being therefore, normally a break (between 43 and 44) in the common return 46—47, from the several annunciator drops, the circuit 6—7 cannot be short-circuited or the battery 5 exhausted, by an improperly closed circuit through one of the front contacts of the diaphragm contact devices, or through other similar disturbances. The circuit through one of the annunciator drops can be closed only while the alarm transmitter is operating. As will be explained hereinafter, each one of the shutters of the annunciator drops 45, 48 and 49, corresponding respectively to the three signal initiating devices, when once moved to the displayed position, is held in such position, independent of the electric circuits, until restored as hereinafter described.

54 in Fig. 1 designates the usual ground connection of signal transmitters operating according to the well known McCullough system; and it will be understood that the signal wheel 9 will also be arranged according to the McCullough system, the purpose of this McCullough system being to insure a signal at the central station even though one side of the circuit from the signal box to the central station is broken.

The glass tube retardation devices (3 in Fig. 1 and 24 in Fig. 2), constitute electric insulators completely isolating the detector loops, electrically, from the alarm initiating device 1 and the circuits thereof, so minimizing possibility of derangement of the system by short circuiting or other disturbance of circuit conditions through contact of the detector loop with some electric conductor.

It will be noted that the circuits of Fig. 1 provide for indication of derangement, not only when the circuit 6—7 is broken, but also when the battery 5 fails. This advantage I obtain by providing a normally closed circuit from said battery through the starting magnet 8 of the alarm-transmitter. The resistance of this magnet 8 is very high, so that the normal current from battery 5 amounts to, usually, only one or two milliamperes. I have found that one cell of ordinary dry battery is usually sufficient for the battery 5, and I have found that a current as low as one or two milliamperes, not only does not appreciably exhaust such a battery, but also that the battery remains in condition for service much longer when there is such a slight flow of current from it normally, than when the battery is used on open circuit; for dry batteries such as are ordinarily obtainable, are subject, when out of use, that is to say, when on an open circuit, to a progressive deterioration due to internal conditions; and a slight flow of current from the battery tends to minimize this deterioration. The condition is somewhat similar to that which exists in the well known gravity battery, which, as is well known, works better on closed circuits than on open circuits.

The annunciator drop mechanism heretofore referred to is illustrated in detail in Figs. 5, 6 and 7. Each drop comprises a magnet, as for example, magnet 48, having pivoted in front of its pole piece a curved armature 58 pivoted at 59 and having side pieces 60 carrying the shutter 32. The said armature also carries a hook shaped catch 61 adapted to be engaged by a latch pin 62 projecting from the axis shaft 63 of a weight 64, which weight is pivoted outside of the frame plates 65. The arrangement is such that the shutter, once pulled into the displayed position by the action of the magnet, remains locked in such position by engagement of the wire 62 with the hook 61, until the entire drop mechanism is tilted downward; that is to say, the end carrying the shutter is tilted downward. When this happens, the weight 64 swings to the right of Figs. 6 and 7, (as indicated by a dot-and-dash line in Fig. 7) so moving the pin out of the path of the hook and permitting the armature to fall by gravity so as to move the shutter to the concealed position shown in Fig. 6. Fig. 7 shows the shutter in the displayed position. The curved armature 58 is curved eccentrically with reference to its axis of rotation, so that motion of said armature from the position shown in Fig. 6 to the position shown in Fig. 7 moves the face of said armature nearer the pole of the magnet. It is for this reason that energization of the magnet suffices to move the armature above the axis from the position shown in Fig. 6 to the position shown in Fig. 7. The armature shutter and side plates 60 constitute in effect one integral structure, the armature being much heavier than the shutter, and it is for this reason that the shutter is said to "fall" when it moves from the position shown in Fig. 7 (the displayed position), to the position shown in Fig. 6 (the concealed position); the structure as a whole falling, though the shutter itself rises. For a similar reason, it is said that the shutter rises when it moves from the position shown in Fig. 6, though in fact the shutter itself really falls. Such usage corresponds to present day use of the terms "rise" and "fall" in the annunciator art.

Customarily I mount the various annunciator mechanisms in a suitable case, securing the various annunciator mechanisms, end-on to a hinged door 66 of this case. As previously explained, the "O K" drop 31, normally has its shutter displayed, while the other drops normally have their shutters in the concealed position. So long as none of the signal initiating devices 1 close their annunciator circuits, due to a rise of temperature, in the region through which their respective detector loops pass, the shutters of the drops other than drop 31 will remain concealed; but when one of the signal initiating devices 1, closes its corresponding annunciator circuit, and starts the signal transmitter in operation, then, as previously explained, after one rotation of the signal wheel 9 of that transmitter, the circuit through the corresponding annunciator drop magnet will be closed and such magnet, being energized, will pull its shutter to the displayed position, where such shutter will be held by engagement of the pin 62 with the catch 61. The shutter thus remains displayed until reset, independent of whether its corresponding magnet remains energized or not. The resetting is effected by swinging downward the door 66 to which the various annunciator drops are attached, for, as shown particularly in Fig. 5, the effect of swinging downward this door is to tilt downward the shutter ends of the annunciator drop mechanism, so permitting the weight 64 of any drop mechanism, the shutter of which is displayed, to swing so as to trip the corresponding shutter armature and permit such armature to drop by gravity and so move its shutter to the concealed position. It may be stated here that the drop mechanism of the "O K" drop, 31, differs from the mechanisms of the other drops, in that this "O K" drop is not provided with the latch 61, weight 64 and locking pin 62. This is indicated in Fig. 5 by absence of any weight 64 for the upper drop mechanism, corresponding to drop 31 of Fig. 1. Therefore the shutter of this drop 31 is not restored by swinging downward the door 66, but instead the shutter of this "O K" drop, being held displayed by the energization of its magnet 31, remains displayed, and so given a continuous indication that the circuit 6—7 is complete and the battery 5 delivering current of adequate strength, until the circuit 6—7 is broken, or the battery 5 fails, whereupon the shutter 32 moves by gravity to its concealed position. Upon the restoration of the circuit 6—7, or upon restoration of full current strength, the shutter 32, moves, by reason of attraction of its magnet, back to its displayed position. One important advantage of mounting the annunciator drop mechanisms upon a door of a case, and of employing mechanism so arranged that they are restored by the opening of the door and the tilting downward of such mechanism, is, that thereby these drop mechanisms may all be mounted in a water tight case which does not require any hole for the passage of a resetting rod or the like. The drop mechanisms may thereby be protected from the effects of water, moisture of the air, etc. The door 66 of the case inclosing the annunciator drop mechanisms will customarily have a glass front, so that any shutter when it moves to the displayed position, may be seen, when the door of the case is closed.

67 and 68, in Fig. 1, designate groups of binding posts.

In Fig. 1 I have shown the several detector loops 2 (which, as above explained are electrically insulated from the signal initiating devices 1) connected in a series in a local circuit 69 including a battery 70 and a relay 71; this circuit being normally closed and the relay 71 being preferably a relay of high resistance, so that the flow of current through the circuit 69 is very small; the advantage of which is, as above explained, that one or two cells of dry battery may supply the current necessary in the circuit, for a long period of time, without material drop in current strength. I have shown the circuit conductor 7 as connected to the front contacts of this relay 71, so that said relay controls the circuit 6—7; but since the contacts of relay 71 are normally closed, the effect of said relay on the circuit may be neglected, and has been neglected heretofore, in considering the normal operation of the apparatus. If for any reason one of the detector loops 2 should be broken, the circuit 69 will be broken and relay 71 will operate so as to break circuit 6—7, the effect of the breaking of this circuit being to cause the signal transmitter 8 to give a "trouble signal" as previously explained.

Referring now to the signal transmitter, illustrated in Figs. 8, 9 and 10 inclusive, this signal transmitter is illustrated merely as one of numerous transmitters convenient for the purpose, and is not claimed as part of this invention. It comprises a magnet 8 having a pivoted armature 72 arranged to move up and down and so move correspondingly, the stop arm 73 adapted to engage a notch 74 in the edge of a spring drum 75. The transmitter further comprises a spring-driven clock train, the driving spring (not shown) being within the spring drum 75 and being arranged to be wound by means of the stem 76 (Figs. 9 and 10). The train comprises a gear 77 carried by the spring drum 75, and various intermediate gears and pinions driving the break wheel 9 and an escapement wheel 78, the motion of which is controlled by a pallet 79 and pendulum 80. It will readily be seen that when, by the dropping of armature 72, (which has the effect of moving stop arm 73 to the right of Fig. 9) said arm is freed from the notch in the spring drum 75, the clock train starts in operation, rotating the break wheels 9 and 10 and the escapement wheel 78, the motion of the escapement wheel being regulated by the action of the pendulum 80. When, upon restoration of the circuit through the magnet 8, said magnet attracts its armature, as soon as the notch in the spring drum 75 comes opposite the stop arm 73, said arm moves into the notch, to arrest the rotation of the clock train. As this engagement of the arm 73 with the notch of the clock train is hardly as precise as desirable, for the arresting of the train, I provide auxiliary arresting means, comprising a bell crank lever 81 (Figs. 9 and 10) one arm 81$^a$ of which projects to one side and is weighted, while the other arm carries a stop pin 81$^b$ adapted to engage a corresponding stop 82 carried by the pallet 79. Engagement of these pins arrests the vibration of the pallet and so arrests the rotation of the clock train; but such engagement can occur only when the stop arm 73 has moved into a notch in the periphery of spring drum 75. It will be seen that the operation of this transmitter is such that when the circuit of the magnet 8 is broken, the stop arm 73 moved out of the notch of the spring drum 75, and the pin 81$^b$ moves out of engagement with pin 82, so permitting the clock train to run; and when, after the closing of the circuit of the magnet 8 the stop arm 73 comes opposite the notch in the periphery of the drum 75, said arm 73 moves into such notch, and the pin 81$^b$ moves into engagement with pin 82, so arresting the train.

Heretofore it has been common in this art to lead the various detector loops, located on different floors of a building, to some one central point. This involves an unnecessary length of detector tubing, making the system less responsive than it should be. Instead of so doing, where various detector loops are to be located on different floors, I usually locate the signal initiating device for each detector loop, on that floor of the building where the corresponding detector loop is located, leading the circuit conductors from such signal initiating device to a central point in the building. This is indicated in Fig. 1 by the leading of the various circuit conductors to binding posts 67 and 68, the binding posts of each group arranged in proximity to one another. If desired, a plurality of detector loops may be led to a single initiating device. This is illustrated in Fig. 11. It will be apparent that a rapid rise of temperature in the region through which any one of these loops runs, has substantially the same effect on the signal initiating device, as if no other loops were connected to that signal initiating device.

I have heretofore described the testing of the loops as being effected by a pump connected temporarily to a three way valve located in the circuit of the loop, as indicated particularly in Figs. 2 and 3. It is convenient, however, to employ, instead of the pump, a device actuated directly by rise in temperature, and, preferably, located permanently in the loop to be tested; and such a device is illustrated in Fig. 12, and comprises a coil 83 of tubing, corresponding substantially to the detector tubing 2, located in a detector loop 2; and in coöperative proximity to this pipe coil 83, I have provided an electrical heating coil 84, adapted to be connected in an electric circuit. The resistance of the heating coils 84, and the length of the piping in loop 83, may be so proportioned as to give the effect of a unit rise in temperature over a unit length of detector tubing, as required by the Board of Fire Underwriters when the resistance coils are connected to a standard source of current. This testing device is preferably located within a hermetically sealed and exhausted chamber, 86 (which may be formed of glass or the like) the tubing 83 and the circuit wires passing through and sealed in the walls of the chamber, so that they are protected efficiently against moisture, dust, etc. Such a device, located in an exhausted chamber, heats up much more rapidly, and so is far more sensitive, than if exposed to air at atmospheric pressure. The heating coil 84 and pipe coil 83 may be wound around an insulating core 87; the pipe coil being of course, spaced away from the resistance coil. The great advantage of this testing device shown in Fig. 12, as compared with the use of a pump, as heretofore described in connection with Figs. 2 and 3, is that the device shown in Fig. 12 reproduces exactly the minimum conditions under which the system should give an alarm. The length of tubing in the coil 83, and the resistance in the resistance coil 84 will be such that, with a standard current flowing through the resistance coil, the expansion of the air in the coil 83 will just be sufficient to operate the corresponding diaphragm contact device within the maximum time allowed by the Board of Fire Underwriters. Any leak, however minute, in the pipe, will delay the action of the corresponding diaphragm contact device beyond the allotted period, so indicating positively the existence of a leak; while if, on continuing the flow of current through the heating coil for a longer period the diaphragm eventually responds, this shows that one side at least of the detector loop is sufficiently intact to give indications. When using a pump or like device, as a testing device, it is difficult to adjust the action of the pump to different lengths of detector tubing, so as to give a fair test to a long length of tubing, and at the same time to avoid impairing the diaphragm contact device of a short length of tubing. But the testing means shown in Fig. 12, permanently located in each loop of detector tubing, and adjusted to that particular loop, tests fairly its own loop, without exposing the corresponding diaphragm contact device to any excessive pressure. This testing device shown in Fig. 12 also permits very accurate testing of the action of the regulating escape means of the diaphragm contact device, in preventing false alarms; for by passing through the resistance coil of the testing device a current which should be just insufficient to cause the operation of the diaphragm contact device, if the regulated escape means is operating properly it will allow sufficient escape of air to prevent the diaphragm from being actuated by this insufficient current; but on the other hand if the regulated escape means is obstructed or improperly adjusted to the length of tubing served by it, then such weak current may cause the diaphragm contact device to operate. It is very difficult, if not practically impossible, to test such a regulated escape means when pumping in air from a pump; as the action of the pump is not sufficiently uniform, steady, or delicate. The testing device shown in Fig. 12 has the further advantage that under no circumstances will it introduce dust, dirt, or moisture, into the detector tubing; whereas a pump is very apt to do so.

To exclude dust from the regulated escape means of the diaphragm contact devices illustrated in Figs. 2 and 3, I may provide a layer of porous material 88 (cloth or the like) between the end of the tube 21 and the cap 23.

By arranging to shunt the circuit 39—40 through contacts 41 and 42, after one round of the signal, in case of trouble in the system, I provide a distinctive "trouble signal" consisting of only one round of the box number; whereas the normal alarm signal from such box will comprise several rounds of the box number—usually four or five.

The present application is a division of an application filed July 23, 1909, Sr. No. 509,103, in which I have claimed the combination with fluid pressure actuated means, of a detector pipe loop comprising impedance, as hereinbefore described, also a fluid-pressure-actuated contact device having the improved restricted escape means hereinbefore described; also the diaphragm contact device hereinbefore described. In the present application I claim the improved annunciator hereinbefore described, in its combinations, also the combinations including the electrical features of the system.

What I claim is:—

1. A supervisory signal system comprising in combination one or more alarm initiating devices having contact means, a signal transmitter having a controlling magnet, a normally closed circuit including said magnet and contact means of said signal initiating device or devices and a source of current supply, and indicating means in said circuit adapted to indicate interruption of the circuit or material decrease of current flow therethrough, said signal transmitter comprising transmitting means controlled by said magnet and transmission-preventing means for preventing transmission of a signal thereby after said transmitting means has transmitted a predetermined signal, said indicating means comprising means for making said signal preventing means operative in case of breakage of said circuit or material decrease in current flow therethrough.

2. A supervisory signal system comprising in combination one or more alarm initiating devices having contact means, a signal transmitter having a controlling magnet, a normally closed circuit including said magnet and contact means of said signal, initiating device or devices and a source of current supply, and indicating means in said circuit adapted to indicate interruption of the circuit or material decrease of current flow therethrough, said signal transmitter comprising transmitting means controlled by said magnet and shunting contact means for preventing transmission of a signal thereby after said transmitting means has transmitted a predetermined signal, a normally open shunt connection connecting such shunt contact means across the contacts of said signal transmitting means, said indicating means comprising means controlling such shunt connection and arranged to close same in case of breakage of said circuit or material decrease of current flow therethrough.

3. A supervisory signal system comprising in combination a plurality of alarm initiating devices having contact means, a signal transmitter having a controlling magnet, a normally closed circuit including said magnet and contact means of said signal initiating devices and a source of current supply, indicating means in said circuit adapted to indicate interruption of the circuit or material decrease of current flow therethrough, other indicating means and circuit means electrically connecting same to said alarm initiating devices, said signal transmitter comprising transmitting means controlled by said magnet and transmission-preventing means for preventing transmission of the signal thereby after said transmitting means has transmitted a predetermined signal, said first mentioned indicating means comprising means for making said signal preventing means operative in case of breakage of said circuit, or material decrease in current flow therethrough, said signal transmitting means comprising contact means controlling said last mentioned indicating means and arranged to make the same operative after a predetermined period of operation of said transmitting means.

4. In a supervisory signal system, the combination of one or more lengths of detector tubing and one or more fluid-pressure-actuated contact devices, said lengths of detector tubing each connected to a contact device, a signal transmitter having a controlling magnet, indicating means and a normally closed circuit including said magnet, contact means of said contact device or devices, and a source of current supply, said indicating means arranged to indicate breakage of said circuit or material decrease of current flow therethrough, a circuit including said detector tubing and a source of current supply, and means operated by said last mentioned circuit for breaking said first mentioned circuit in case of interruption of said last mentioned circuit.

5. A supervisory signal system comprising in combination a plurality of alarm initiating devices having contact means, a signal transmitter having a controlling magnet, a circuit controlling said magnet and controlled by the contact means of said alarm initiating devices, whereby when one of said alarm initiating devices operates the signal transmitter is caused to operate, an annunciator comprising a plurality of indicating devices, one for each such signal initiating device, and a circuit connecting contact means of each such signal initiating device to a corresponding indicating device of the annunciator, said transmitter having contact means controlling the circuits from the several signal initiating devices to the corresponding indicating devices of the annunciator, which contact means prevents closing of a circuit from one of the signal initiating devices to the annunciator except when the signal transmitter is operating.

In testimony whereof, I affix my signature in the presence of two witnesses.

JAMES G. NOLEN.

Witnesses:
H. M. MARBLE,
D. A. DAVIES.